US012521639B2

(12) United States Patent
Lim et al.

(10) Patent No.: US 12,521,639 B2
(45) Date of Patent: Jan. 13, 2026

(54) APPARATUS AND METHOD FOR REALIZING REAL-TIME SPATIAL STRUCTURE

(71) Applicant: ELECTRONICS AND TELECOMMUNICATIONS RESEARCH INSTITUTE, Daejeon (KR)

(72) Inventors: Seong Jae Lim, Daejeon (KR); Seung Wook Lee, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 579 days.

(21) Appl. No.: 18/071,124

(22) Filed: Nov. 29, 2022

(65) Prior Publication Data

US 2023/0211242 A1 Jul. 6, 2023

(30) Foreign Application Priority Data

Jan. 4, 2022 (KR) ........................ 10-2022-0000966

(51) Int. Cl.

| | |
|---|---|
| ***A63G 31/00*** | (2006.01) |
| ***A63F 13/216*** | (2014.01) |
| ***A63F 13/235*** | (2014.01) |
| ***A63F 13/428*** | (2014.01) |
| ***A63F 13/57*** | (2014.01) |
| ***A63F 13/65*** | (2014.01) |

(52) U.S. Cl.

CPC ............ *A63G 31/00* (2013.01); *A63F 13/216* (2014.09); *A63F 13/235* (2014.09); *A63F 13/428* (2014.09); *A63F 13/57* (2014.09); *A63F 13/65* (2014.09); *A63F 2300/8082* (2013.01)

(58) Field of Classification Search

CPC ..... A63G 31/00; A63F 13/216; A63F 13/235; A63F 13/428; A63F 13/57; A63F 13/65; G06T 19/006

See application file for complete search history.

(56) References Cited

U.S. PATENT DOCUMENTS

| | | | | |
|---|---|---|---|---|
| 8,714,746 B2 | | 5/2014 | Choi et al. | |
| 9,892,323 B2 | | 2/2018 | Cho et al. | |
| 2015/0190726 | A1 * | 7/2015 | Frolov .................... | A63G 1/02 472/61 |
| 2017/0200313 | A1 | 7/2017 | Lee et al. | |
| 2018/0369702 | A1 * | 12/2018 | Hake ...................... | A63G 25/00 |
| 2022/0258044 | A1 * | 8/2022 | Magpuri .................. | A63J 5/00 |

FOREIGN PATENT DOCUMENTS

| | | |
|---|---|---|
| KR | 20180078127 A | 7/2018 |
| KR | 20190046210 A | 5/2019 |
| KR | 102286987 B1 | 8/2021 |

* cited by examiner

*Primary Examiner* — Thomas M Sember

(74) *Attorney, Agent, or Firm* — Rabin & Berdo, P.C.

(57) ABSTRACT

A method for realizing a real-time spatial structure in an apparatus for realizing a real-time spatial structure is provided. The method for realizing a real-time spatial structure includes: tracking a movement path of a player; and realizing a spatial structure in the space on the movement path of the player using at least one of water sprayed through water spray modules of a mesh structure installed on a ceiling and electromagnet ropes of the mesh structure.

19 Claims, 7 Drawing Sheets

APPARATUS AND METHOD FOR REALIZING REAL-TIME SPATIAL STRUCTURE

CROSS-REFERENCE TO RELATED APPLICATION

This application claims priority to and the benefit of Korean Patent Application No. 10-2022-0000966 filed in the Korean Intellectual Property Office on Jan. 4, 2022, the entire contents of which are incorporated herein by reference.

BACKGROUND OF THE INVENTION

(a) Field of the Invention

The present disclosure relates to an apparatus and method for realizing a real-time spatial structure, and more particularly, to an apparatus and method for realizing a real-time spatial structure so that a player of an extended reality such as augmented reality including virtual reality and mixed reality can actually feel a spatial structure and a moving object and experience a physical reaction.

(b) Description of the Related Art

Currently, the player space of eXtended Reality (XR) such as augmented reality including virtual reality and mixed reality is provided in a form mixed with a visual virtual structure or a real structure in the real world. This is a situation in which the sense of immersion is significantly reduced because the player does not experience physical reactions such as collision, impact, and blockage caused by the real structure, or only a limited experience is possible because the real structure is placed in advance and only limited space and form expression are possible. Efforts have been made to improve the sensibility of structures with various haptic devices, but with current technology, only limited sensation is possible because temperature, wind, vibration, and electric shock can be applied to limited body parts such as the head, hands, wrists, feet, ankles, and chest.

For example, HaptX recently developed AxonVR, a haptic glove that can feel a single grain of rice in a digital space, but it is a device that feels the sensation by putting the hand into a large device, and it is judged that it will take a lot of time to apply it in practice.

SUMMARY OF THE INVENTION

The present disclosure has been made in an effort to provide an apparatus and method for realizing a real-time spatial structure which enables user to experience realistic and realistic interaction and real physical reaction with respect to a limited experience space.

According to one embodiment, a method for realizing a real-time spatial structure in an apparatus for realizing a real-time spatial structure is provided. The method for realizing a real-time spatial structure includes: tracking a movement path of a player; and realizing a spatial structure in the space on the movement path of the player using at least one of water sprayed through water spray modules of a mesh structure installed on a ceiling and electromagnet ropes of the mesh structure.

The mesh structure may be composed of a plurality of layers, and the realizing a structure may include adjusting a temperature of the water sprayed by the water spray modules differently for each layer of the mesh structure.

The mesh structure may include a plurality of nodes and a plurality of edges connecting between the nodes, and the water spray modules may be respectively installed in the plurality of edges, and the electromagnet ropes may be respectively installed in the plurality of nodes.

The realizing the spatial structure may include expressing the structure by controlling the water spray modules installed at an edge of a corresponding position according to the movement of the player to spray water.

The realizing of the spatial structure may include expressing the spatial structure by lowering the electromagnet ropes installed at the nodes of the corresponding position to the floor.

The method for realizing a real-time spatial structure may further include: detecting a player approach to the spatial structure realized by water and electromagnet ropes; and transmitting an alarm signal to a device possessed by the player.

The method for realizing a real-time spatial structure may further include, before the realizing of the spatial structure, performing scale mapping between the virtual space and the real space.

The performing scale mapping may include performing the scale mapping in consideration of at least one of a ratio of the size of the virtual space to the real space, a size of an idle space around the player, a reflected weight and a direction change weight between a movement of the player in the real space, and a movement of the player in the virtual space.

The tracking a movement path of a player may include: learning using data collected the movement and movement path of players; and predicting a location of the player based on a learning result.

According to another embodiment, an apparatus for realizing a real-time spatial structure that realizes a spatial structure in real time is provided. The apparatus for realizing a real-time spatial structure includes: a tracker that tracks a location of a player; and a structure realizer that realizes a spatial structure using water and electromagnet ropes in a space on a movement path of the player according to the location of the player.

The structure realizer may include: water spray modules that are located in a mesh structure installed on a ceiling and that spray water according to a first control signal; an electromagnet rope module that lowers the electromagnet ropes installed in the mesh structure to the floor according to a second control signal; and a control module that outputs the first control signal and the second control signal to the water spray modules and the electromagnet rope module according to the movement path of the player.

The mesh structure may be composed of a plurality of layers, and the structure realizer may further include a temperature control module for providing water at different temperatures for each layer of the mesh structure.

The mesh structure may include a plurality of nodes and a plurality of edges connecting between the nodes, the water spray modules may be respectively installed on the plurality of edges, and the electromagnet ropes may be respectively installed on the plurality of nodes.

The water spray modules respectively installed at the plurality of edges may operate independently according to the first control signal of the control module.

The structure realizer may further include an infrared sensor for detecting a player approach to the spatial structure realized with water and electromagnet ropes, and the tracker may transmit an alarm signal based on a detection result of the infrared sensor.

The structure realizer may include: a water collection module that collects the water sprayed by the water spraying modules; and a water circulation module that circulates the collected water and supplies it to the water spray modules.

The apparatus for realizing a real-time spatial structure may further include a spatial structure calculator that performs scale mapping between the virtual space and the real space for the spatial structure.

The tracker may learn using data collected the movement and movement path of players, and may predict a location of the player based on a learning result.

The spatial structure may include at least one of a window, a wall, a door, and a person.

DETAILED DESCRIPTION OF THE EMBODIMENTS

Figure 1:
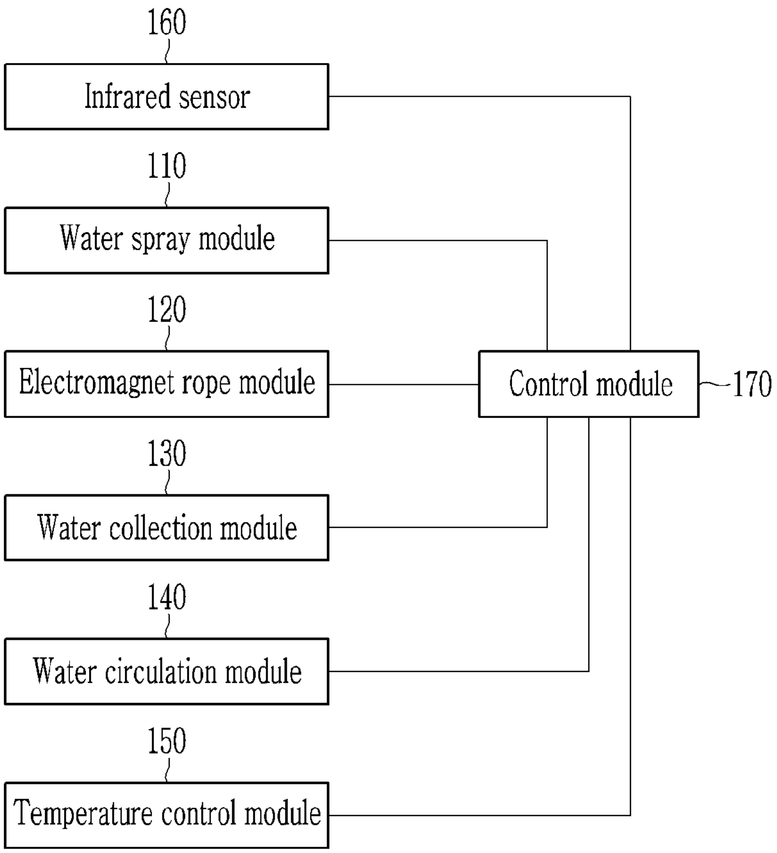
FIG. 1 is a diagram illustrating an apparatus for realizing a real-time spatial structure according to an embodiment.

Hereinafter, embodiments of the disclosure will be described in detail with reference to the attached drawings so that a person of ordinary skill in the art may easily implement the disclosure. As those skilled in the art would realize, the described embodiments may be modified in various different ways, all without departing from the spirit or scope of the disclosure. The drawings and description are to be regarded as illustrative in nature and not restrictive. Like reference numerals designate like elements throughout the specification.

Throughout the specification and claims, when a part is referred to "include" a certain element, it means that it may further include other elements rather than exclude other elements, unless specifically indicated otherwise.

Now, an apparatus and method for realizing a real-time spatial structure according to an embodiment of the present disclosure will be described in detail with reference to the drawings.

In an embodiment of the present disclosure, structures of a space in which a player moves in real time is realized using water sprayed from the ceiling and a flexible electromagnet rope for a physical realistic experience of the player in extended reality such augmented reality including virtual reality and mixed reality, etc.

FIG. 1 is a diagram illustrating an apparatus for realizing a real-time spatial structure according to an embodiment.

Referring to FIG. 1, the apparatus for realizing a real-time spatial structure realizes structures of a space in which a player moves in real time using water sprayed from the ceiling and a flexible electromagnet rope for a physical realistic experience of the player in extended reality such as augmented reality including virtual reality and mixed reality, etc.

The apparatus for realizing a real-time spatial structure includes a water spray module 110, an electromagnet rope module 120, a water collection module 130, a water circulation module 140, and a temperature control module 150. The apparatus for realizing a real-time spatial structure may further include an infrared sensor 160. In addition, the apparatus for realizing a real-time spatial structure further includes a control module 170 controlling the water spray module 110, the electromagnet rope module 120, the water collection module 130, the water circulation module 140, the temperature control module 150, and the infrared sensor 160.

The water spray module 110 sprays water according to a control signal from the control module 170.

The electromagnet rope module 120 lowers the electromagnet rope of the corresponding position to the floor according to the control signal of the control module 170.

A space structure such as an obstacle such as a wall, a passage, or a door may be realized by the water sprayed by the water spray module 110 and the electromagnet rope lowered to the floor.

Figure 2:
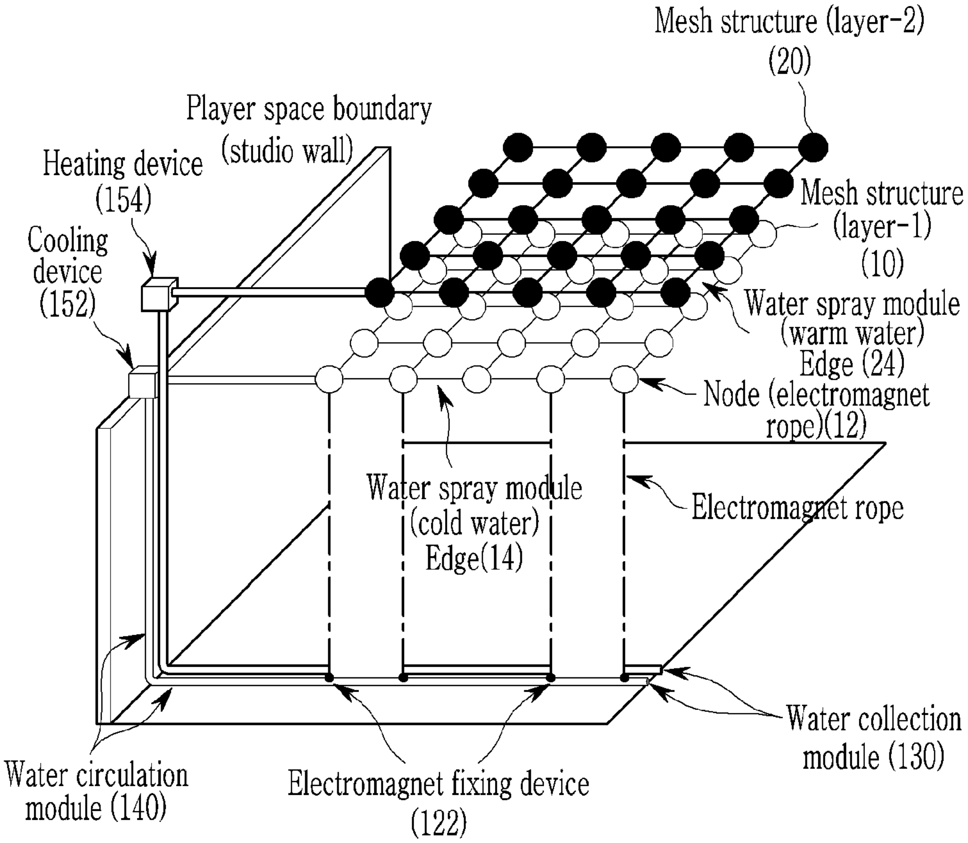
FIG. 2 is a diagram showing an example in which the modules shown in FIG. 1 are installed in a real space.

FIG. 2 is a diagram showing an example in which the modules shown in FIG. 1 are installed in a real space.

Referring to FIG. 2, the mesh structures 10 and 20 are composed of two or more layers on the ceiling in the player space. FIG. 2 shows the mesh structures 10 and 20 composed of two layers for convenience of description.

The mesh structure 10 includes a plurality of nodes 12 and the edges 14 connecting between the nodes 12, and the mesh structure 20 includes a plurality of nodes 22 and the edges 24 connecting between the nodes 22.

The mesh structures 10 and 20 composed of two or more layers are arranged so that the nodes 12 and 22 do not overlap each other.

The water spray module 110 is installed on the edges 14 and 24 of the mesh structure 10 and 20. That is, the edges 14 and 24 may be conduits through which water may pass. The infrared sensor 160 may also be installed on the edges 14 and 24 of the mesh structures 10 and 20. In each mesh structure 10 and 20, the edges 14 and 24 connecting nodes 12 and 22 are independent. Specifically, in one mesh structure (e.g., 10), the edges 14 connecting between the nodes 12 are independent, and accordingly, the water spray module 110 installed at each edge 14 is also operate independently according to the control of the control module 170.

The infrared sensor 160 detects the approach of the player to a spatial structure realized with water and electromagnet ropes, and transmits an alarm signal to a device possessed by the player according to the detection result of the infrared sensor 160, thereby providing a more realistic interaction effect with the spatial structures.

The electromagnet ropes of the electromagnet rope module 120 may be installed only in one mesh structure (e.g., 10) among the mesh structures 10 and 20.

An electromagnet fixing device 122 may be installed on the floor to correspond to the installation position of the electromagnet ropes so that it can be fixed to the floor when the electromagnet ropes are lowered. Then, when the electromagnet ropes are lowered to the floor, it is fixed by the electromagnet fixing device 122.

The floor may be composed of a steel structure with electromagnetic force so that the end of the electromagnet ropes can be fixed.

The distance between the nodes 12 in the mesh structure 10 may be set so that the electromagnet rope is lowered to the floor to implement a spatial structure. For example, if the distance between the nodes 12 in the mesh structure 10 is too wide, the player may not feel as if there is a structure corresponding to the wall because the player may pass between the electromagnet ropes.

The control module 170 controls the water spray module 110 and the electromagnet rope module 120 according to the movement path of the player, thereby spraying water in real time according to the movement path of the player and lowering the electromagnet ropes to the floor to realize spatial structures.

The water collection module 130 collects water sprayed by the water spraying module 110. So that the water sprayed by the water spray module 110 can be collected, the floor in the play space of the player has a drainage structure through which water can pass, and the water sprayed by the water spray module 110 by the drainage structure is collected again by the water collection module 130.

The water circulation module 140 circulates the water collected by the water collection module 130 and supplies it to the water spray module 110 located on the ceiling. The water circulation module 140 provides a passage for water to move from the water collection module 130 to the mesh structures 10 and 20. The passage for water may be formed on the outer boundary wall of the play space.

The temperature control module 150 may include a cooling device 152 and a heating device 154. The cooling device 152 and the heating device 154 serve to lower or increase the water supplied from the water circulation module 140 to the water spray module 110 to a set temperature.

The cooling device 152 and the heating device 154 may be installed in different mesh structures 10 and 20. For example, the cooling devices 152 may be installed in the mesh structure 10, and the heating devices 154 may be installed in the mesh structure 20. In this case, the water spray module 110 installed at the edge of the mesh structure 10 is to spray cold water, and the water spray module 110 installed to the edge of the mesh structure 20 is to spray warm water.

In this way, by varying the temperature of the water supplied to the water spray module 110 of the mesh structures 10 and 20 by the cooling device 152 and the heating device 154, it is possible to realize barriers of various temperatures in multiple layers. Furthermore, it expresses effects such as temperature and fire according to the scenario, and allows the player to physically experience the physical shape and temperature of the structure in a virtual space at the same time.

According to the control of the control module 170, water is sprayed by the water spraying module 110 installed in the mesh structures 10 and 20, collected by the water collection module 130, and the collected water is supplied to the water spray module 110 installed in the mesh structures 10 and 20 of the ceiling by the water circulation module 140. At this time, cold water is supplied to the water spray module 110 of the mesh structure 10, and warm water is supplied to the water spray module 110 of the mesh structure 20, by the cooling device 152 and the heating device 154. The water spray modules 110 installed in the mesh structures 10 and 20 again spray water under the control of the control module 170.

Through this circulation operation, the apparatus for realizing a real-time spatial structure realizes spatial structures such as various building walls, and dividing walls inside buildings, windows, doors, and fixed structures in the path the player moves using the water sprayed by the water spray module 110. The apparatus for realizing a real-time spatial structure can also lower the electromagnet ropes to the floor, making it impossible for players to break through and pass through. In addition, the electromagnet ropes can be realized in the form of horizontally thin and short auxiliary electromagnet ropes attached in between at least some of the electromagnet ropes. In this case, the auxiliary electromagnet ropes are connected, so it makes the player feel more like a fixed structure and can actually form structures that are difficult to invade.

Figure 3:
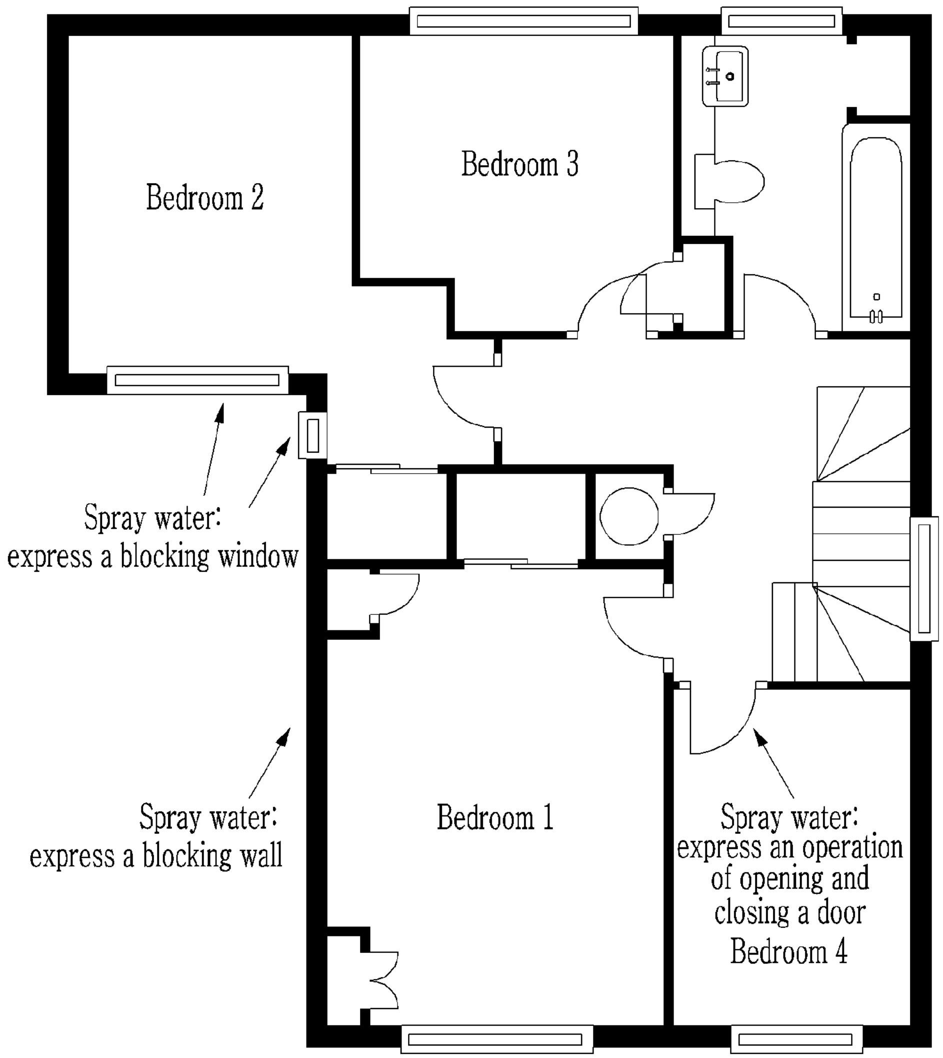
FIG. 3 is a diagram illustrating an example of a spatial structure implemented by an apparatus for realizing a real-time spatial structure according to an embodiment.

FIG. 3 is a diagram illustrating an example of a spatial structure implemented by an apparatus for realizing a real-time spatial structure according to an embodiment.

Referring to FIG. 3, the apparatus for realizing a real-time spatial structure may realize a blocking window, a blocking wall, and a door by spraying water. In addition, if water is not sprayed at the location of the blocking window, it is possible to realize the window opening.

The apparatus for realizing a real-time spatial structure can realize a blocking window and a blocking wall by lowering the electromagnet ropes to the floor while spraying water.

In addition, the apparatus for realizing a real-time spatial structure may express an operation of opening and closing a door by spraying water with a time difference by mesh structures of several layers arranged to not overlap each other.

The apparatus for realizing a real-time spatial structure as described above may be applicable to both indoors such as single-person treadmills and studios, and outdoors. That is, water and electromagnet ropes can be quickly configured and withdrawn, so that various spatial structures can be expressed in a limited space in real time.

Figure 4:
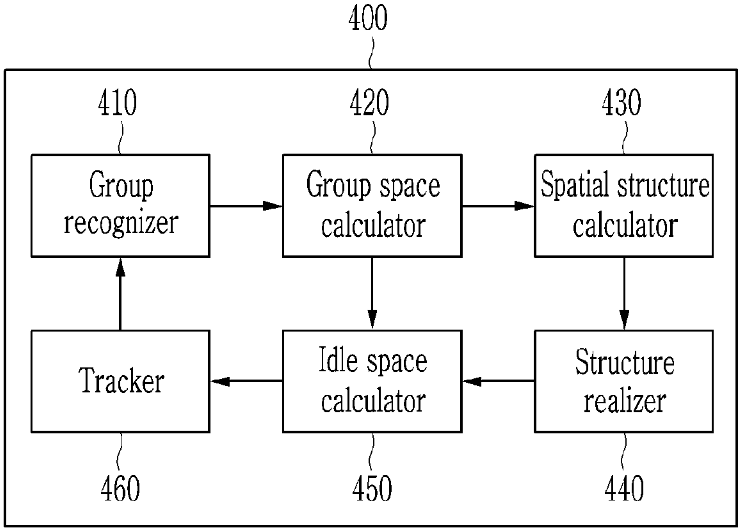
FIG. 4 is a diagram illustrating an apparatus for realizing real-time spatial structure of a large space walk-through type according to an embodiment.

FIG. 4 is a diagram illustrating an apparatus for realizing a real-time spatial structure of a large space walk-through type according to an embodiment.

Referring to FIG. 4, the apparatus for realizing a real-time spatial structure of a walk-through type 400 realizes spatial structures for a group player in real time.

The apparatus for realizing a real-time spatial structure 400 includes a group recognizer 410, a group space calculator 420, a spatial structure calculator 430, a structure realizer 440, an idle space calculator 450, and a tracker 460.

The group recognizer 410 recognizes a group located in the play space. The group recognizer 410 recognizes a group by predicting merging and diverging of players, performs labeling for each group, and matches the position in the real space with the position in the virtual space. Also, the group recognizer 410 may form one group for players within a predetermined area based on the distribution of players within the group, and recognize players outside the corresponding area as another group.

The group space calculator 420 places the group and individual players in the virtual space in consideration of the individual space of the group player and the space occupied by the entire group, and calculates a play area and an idle area of the group.

The spatial structure calculator 430 calculates a degree of scale (abbreviation) of the spatial structures to be expressed for each play space of each group. When a real group plays, in order to solve the problem of not being able to express the wide space of the virtual world due to the physical limitation of the real space, the spatial structure calculator 430 expresses the virtual space in the real space by abbreviating the structures and movement paths in the virtual space according to the real space when the spatial domain of the virtual space cannot be equally implemented in the real space because the spatial domains of the virtual space and the real space are different in size. Furthermore, the spatial structure calculator 430 performs scale mapping of the size, and movement between the virtual space and the real space by increasing the movement and movement stride of the players in the real space in the virtual space.

The scale mapping may be performed as in Equations 1 and 2 so that the difference between the real movement of the player and the movement in the virtual space is hardly felt in consideration of a ratio of the size of the total virtual space to the total real space, a size of the idle space around a player or group of players, a distance between the player or group of players and another group of players, a reflected weight between the movement of the real space and the movement of the virtual space, and a weight of the direction change, etc. In this case, the reflected weight between the real space movement and the virtual space movement may be determined through the learning of the discrepancy performed by projecting the movements of the real space for various players onto the movement of the virtual space. Equation 1 represents the mapping between the movement in the real space and the movement in the virtual space, and Equation 2 represents the mapping between the direction in the real space and the direction in the virtual space.

$$(x\_v, y\_v) = (\text{Mat\_cont}) * (x\_r, y\_r),$$

$$\text{Mat\_cont} = (c\_x, 0; 0, c\_y),$$

$$c\_x = a * (\text{total virtual space } S\_v / \text{total real space } S\_r) + b * (\text{real idle space } s\_i / \text{total real space } S\_r) + c * (\text{distance between groups } s\_bet / \text{total real space } S\_r) + d * (e * W) \quad \text{(Equation 1)}$$

In Equation 1, (x_v, y_v) denotes the position of a player or group in the virtual space, and (x_r, y_r) denotes the position of the player or group in the real space. Mat_cont represents the reflected weight between the movement in the real space and the movement in the virtual space, and a, b, c, and d represent weight values whose sum is 1. W represents the maximum value of spatial discrepancy that a person does not notice between the virtual space and the real space, and e represents a weight having a maximum value of 1.0.

$$(\text{theta\_}v) = (a * \text{dir}) * (\text{theta\_}r) \quad \text{(Equation 2)}$$

In Equation 2, dir denotes a direction change weight, theta_r denotes a rotation angle in real space, and a denotes a weight having a maximum value of 1.0. In general, a is set to 1.0, but it can be adjusted to any value according to the user. theta_v represents a rotation angle in virtual space.

Since the rotation of the real player only occurs on one axis, only a weight for the rotation angle is applied. When the direction to the area in which no collision with the idle area and other player groups occurs among the surrounding areas of the real space of the current play group, the direction change weight represents the value the player needs to rotate relative to the real rotation angle to move in that direction, and it can be determined through learning of the discrepancy performed by projecting the direction change movement of the real space for various players onto the direction change movement of the virtual space.

In this case, the movement and rotation values in the virtual space calculated in Equations 1 and 2 are calculated based on individual players and are not equally applied to groups.

The structure realizer 440 realizes the scale-mapped structures in real time using water spray of the mesh structure and electromagnet ropes in real space. At this time, in virtual space, the structure realizer 440 can operate the layers of the mesh structure for each temperature by reflecting temperature changing in real time in virtual space, fires, explosions of structures, etc. according to scenarios and play flows. To this end, the structure realizer 440 may include the water spray module 110, the electromagnet rope module 120, the water collection module 130, the water circulation module 140, the temperature control module 150, the infrared sensor 160, and the control module 170. In addition, the structure realizer 440 may further include a plurality of cameras (not shown in the drawings) installed on the ceiling.

The idle space calculator 450 calculates the idle space of the real space for each group according to the movement path of each group and the individual players of each group, predicts the next path, and guides the group to the idle space and the past space of the real space.

The tracker 460 estimates and tracks the position, movement, and movement path of the group and individual players of the group. The tracker 460 can estimate the position, movement, and movement path of the group and individual players of the group by using the infrared sensor (160 in FIG. 1), and the tracker 460, and through this, can detect player approach to spatial structures realized with water and electromagnet ropes, and transmits an alarm signal to the device possessed by the player. The tracker 460 may use camera images of a plurality of cameras (not shown in the drawings) installed on the ceiling for estimating the position, movement, and movement path of the group and individual players of the group. The tracker 460 collects data about the movement of the player and movement path of the player in the ongoing scenario and the similar structure, learns a model using the collected data, and may predict the location of the player and the group based on the learning result of the model.

The group recognizer 410, the group space calculator 420, the spatial structure calculator 430, the structure realizer 440, and the idle space calculator 450 and the tracker 460 are sequentially cyclically executed according to the continuous movement of the player.

Figure 5:
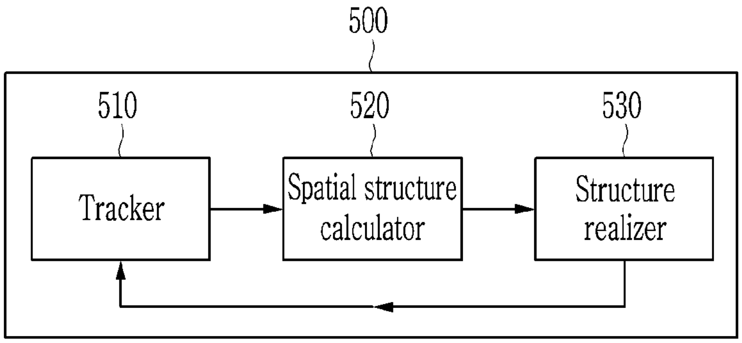
FIG. 5 is a diagram illustrating an apparatus for realizing a real-time spatial structure of a treadmill type for one person according to another embodiment.

FIG. 5 is a diagram illustrating an apparatus for realizing a real-time spatial structure of a treadmill type for one person according to another embodiment.

Referring to FIG. 5, an apparatus for realizing a real-time spatial structure 500 of a treadmill type for a single player realizes spatial structures for a single player in real time.

The apparatus for realizing a real-time spatial structure 500 of a treadmill type includes a tracker 510, a spatial structure calculator 520, and a structure realizer 530.

The tracker 510 tracks and guides the position of the player on the treadmill. The tracker 510 matches the play space and the virtual space of the treadmill one-to-one. The tracker 510 may detect a player approach to spatial structures realized with water and electromagnet ropes through the position of the player, and may transmit an alarm signal to the device possessed by the player. The tracker 510 collects data about the movement of the player and movement path of the player in the ongoing scenario and the similar structure, learns a model using the collected data, and may predict the location of the player based on the learning result of the model.

The spatial structure calculator 520 calculates the degree of scale of the spatial structures. The spatial structure calculator 520 performs scale mapping on the size, and movement between the virtual space and the real space.

The structure realizer 530 realizes the scale-mapped structures in real time by using the water spray of the mesh structures and the electromagnet ropes in real space. The structure realizer 440 may include the water spray module 110, the electromagnet rope module 120, the water collection module 130, the water circulation module 140, the temperature control module 150, the infrared sensor 160, and the control module 170. In addition, the structure realizer 440 may further include a plurality of cameras (not shown in the drawings) installed on the ceiling. The tracker 510, the spatial structure calculator 520, and the structure realizer 530 are sequentially cyclically executed according to the continuous movement of the player.

The structure realizer 440 and 530 according to an embodiment of the present disclosure may apply various structural deformations, such as explosions, hits, earthquakes, and collisions, in real time according to a play scenario to make them feel real. In addition, by expressing various temperatures, such as that of a fire and a refrigerator, through the water spray module (110 in FIG. 1), various more practical effects can be experienced.

The water blockings sprayed from the multi-layered mesh structures of the ceiling are formed as many as the number of layers, allows the user to feel the tension of the water, and provides a barrier effect of walls and obstacles, and the like.

In addition, not only fixed space structures such as walls, but also opening and closing doors, windows, and deformation of space structures can be expressed in real time.

In addition, objects that move like people can be sufficiently expressed.

In addition, the infrared sensor configured together with the ceiling water spray module (110 in FIG. 1) interworks with the device possessed by the player, and transmits an alarm signal to the device possessed by the player when the player is close to the structure, so that the player can feel close to the structures.

Figure 6:
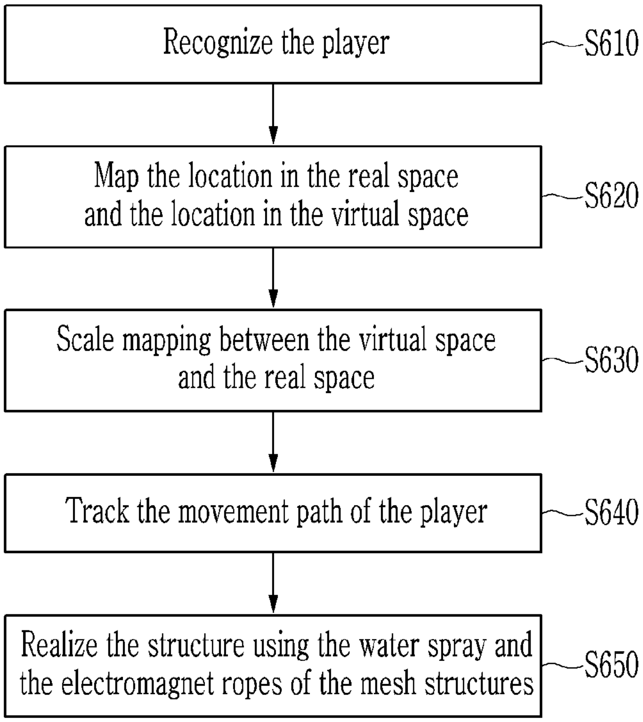
FIG. 6 is a flowchart illustrating a method for realizing a spatial structure in an apparatus for realizing a real-time spatial structure according to an embodiment.

FIG. 6 is a flowchart illustrating a method for realizing a real-time spatial structure in an apparatus for realizing a real-time spatial structure according to an embodiment.

Referring to FIG. 6, the apparatus for realizing a real-time spatial structure tracks the movement path of the player.

The apparatus for realizing a real-time spatial structure recognizes the player (S610), and tracks the movement of the player. The apparatus for realizing a real-time spatial structure may recognize a group.

The apparatus for realizing a real-time spatial structure maps the location in the real space and the location in the virtual space (S620).

The apparatus for realizing a real-time spatial structure performs scale mapping between the virtual space and the real space (S630).

The apparatus for realizing a real-time spatial structure tracks the movement path of the player (S640).

The apparatus for realizing a real-time spatial structure realizes the scale-mapped structure in real time using the water spray of the mesh structures and the electromagnet ropes in the real space (S650).

Figure 7:
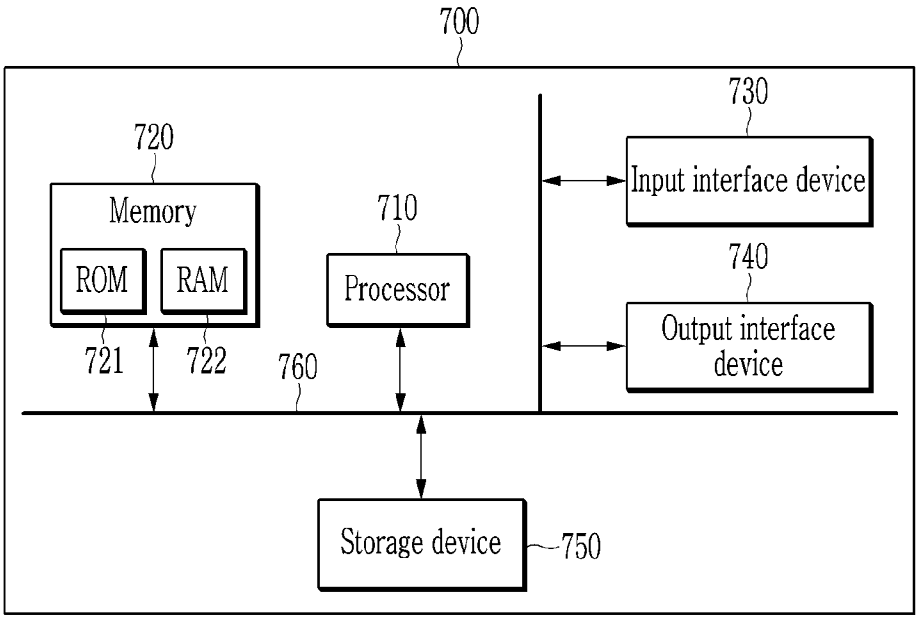
FIG. 7 is a diagram illustrating a computing system in which a method for realizing a spatial structure according to an embodiment is implemented.

FIG. 7 is a diagram illustrating a computing system in which a method for realizing a spatial structure according to an embodiment is implemented.

Referring to FIG. 7, the computing system 700 may include at least one of a processor 710, a memory 720, an input interface device 730, an output interface device 740, and a storage device 750. Each of the components may be connected by a common bus 760 to communicate with each other. In addition, each of the components may be connected through an individual interface or a separate bus centering on the processor 710 instead of the common bus 760.

The processor 710 may be implemented as various types such as an application processor (AP), a central processing unit (CPU), a graphics processing unit (GPU), etc., and may be any semiconductor device that executes a command stored in the memory 720 or the storage device 750. The processor 710 may execute program commands stored in at least one of the memory 720 and the storage device 750. The processor 710 stores program commands for implementing at least some functions of the group recognizer 410, the group space calculator 420, the spatial structure calculator 430, the structure realizer 440, the idle space calculator 450, and the tracker 460 described with reference to FIG. 4 in the memory 720, and may control to perform the operation described with reference to FIGS. 1 to 6. The processor 710 stores program commands for implementing at least some functions of the tracker 510, the spatial structure calculator 520, and the structure realizer 530 described with reference to FIG. 5 in the memory 720, and may control to perform the operation described with reference to FIGS. 1 to 6.

The memory 720 and the storage device 750 may include various types of volatile or non-volatile storage media. For example, the memory 720 may include a read-only memory (ROM) 721 and a random access memory (RAM) 722. The memory 720 may be located inside or outside the processor 710, and the memory 720 may be connected to the processor 710 through various known means.

The input interface device 730 is configured to provide data to the processor 710.

The output interface device 740 is configured to output data from the processor 710.

At least some of a method for realizing a spatial structure according to an embodiment of the present invention may be implemented as a program or software executed in a computing device, and the program or software may be stored in a computer-readable medium.

In addition, at least some of a method for realizing a spatial structure according to an embodiment of the present invention may be implemented as hardware that can be electrically connected to the computing device.

According to an embodiment of the present disclosure, it is possible to experience realistic and realistic interaction and real physical reaction of the experience space through real-time spatial structure realization of structures in virtual reality.

In addition, it is also possible to perform joint operations of several people within a limited space through real-time spatial structure realization of structures of a walk-through type that allows multiple groups to perform different missions as well as a single-person treadmill device.

The components described in the example embodiments may be implemented by hardware components including, for example, at least one digital signal processor (DSP), a processor, a controller, an application-specific integrated circuit (ASIC), a programmable logic element such as an FPGA, other electronic devices, or combinations thereof. At least some of the functions or the processes described in the example embodiments may be implemented by software, and the software may be recorded on a recording medium. The components, functions, and processes described in the example embodiments may be implemented by a combination of hardware and software. The method according to embodiments may be embodied as a program that is executable by a computer, and may be implemented as various recording media such as a magnetic storage medium, an optical reading medium, and a digital storage medium. Various techniques described herein may be implemented as digital electronic circuitry, or as computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal for processing, or to control an operation of a data processing apparatus, e.g., by a programmable processor, a computer, or multiple computers. A computer program(s) may be written in any form of programming language, including compiled or interpreted languages, and may be deployed in any form including a stand-alone program or a module, a component, a subroutine, or other units suitable for use in a computing environment. A computer program may be deployed to be executed on one computer or on multiple computers at one site or distributed across multiple sites and interconnected by a communication network. Processors suitable for execution of a computer program include, by way of example, both general and special purpose microprocessors, and any one or more processors of any kind of digital computer. Generally, a processor will receive instructions and data from a read-only memory or a random access memory or both. Elements of a computer may include at least one processor to execute instructions and one or more memory devices to store instructions and data. Generally, a computer will also include or be coupled to receive data from, transfer data to, or perform both on one or more mass storage devices to store data, e.g., magnetic or magneto-optical disks, or optical disks. Examples of information carriers suitable for embodying computer program instructions and data include semiconductor memory devices, for example, magnetic media such as a hard disk, a floppy disk, and a magnetic tape, optical media such as a compact disk read only memory (CD-ROM), a digital video disk (DVD), etc., and magneto-optical media such as a floptical disk and a read only memory (ROM), a random access memory (RAM), a flash memory, an erasable programmable ROM (EPROM), and an electrically erasable programmable ROM (EEPROM), and any other known computer readable media. A processor and a memory may be supplemented by, or integrated into, a special purpose logic circuit. The processor may run an operating system (08) and one or more software applications that run on the OS. The processor device also may access, store, manipulate, process, and create data in response to execution of the software. For purpose of simplicity, the description of a processor device is used as singular; however, one skilled in the art will appreciate that a processor device may include multiple processing elements and/or multiple types of processing elements. For example, a processor device may include multiple processors or a processor and a controller. In addition, different processing configurations are possible, such as parallel processors. Also, non-transitory computer-readable media may be any available media that may be accessed by a computer, and may include both computer storage media and transmission media. The present specification includes details of a number of specific implements, but it should be understood that the details do not limit any disclosure or what is claimable in the specification but rather describe features of the specific example embodiment. Features described in the specification in the context of individual example embodiments may be implemented as a combination in a single example embodiment. In contrast, various features described in the specification in the context of a single example embodiment may be implemented in multiple example embodiments individually or in an appropriate sub-combination. Furthermore, the features may operate in a specific combination and may be initially described as claimed in the combination, but one or more features may be excluded from the claimed combination in some cases, and the claimed combination may be changed into a sub-combination or a modification of a sub-combination. Similarly, even though operations are described in a specific order in the drawings, it should not be understood as the operations needing to be performed in the specific order or in sequence to obtain desired results or as all the operations needing to be performed. In a specific case, multitasking and parallel processing may be advantageous. In addition, it should not be understood as requiring separation of various apparatus components in the above-described example embodiments in all example embodiments, and it should be understood that the above-described program components and apparatuses may be incorporated into a single software product or may be packaged in multiple software products.

It should be understood that the embodiments disclosed herein are merely illustrative and are not intended to limit the scope of the disclosure. It will be apparent to one of ordinary skill in the art that various modifications of the embodiments may be made without departing from the spirit and scope of the claims and their equivalents.

What is claimed is:

1. A method for realizing a real-time spatial structure in an apparatus for realizing the real-time spatial structure, the method comprising:

tracking a movement path of a player; and realizing the real-time spatial structure in a space on the movement path of the player using at least one of water sprayed through water spray modules of a mesh structure installed on a ceiling and electromagnet ropes of the mesh structure.

2. The method of claim 1, wherein the mesh structure is composed of a plurality of layers, and the realizing of the real-time spatial structure includes adjusting a temperature of the water sprayed by the water spray modules differently for each of the layers of the mesh structure.

3. The method of claim 1, wherein the mesh structure includes a plurality of nodes and a plurality of edges connecting between the plurality of nodes, the water spray modules are respectively installed in the plurality of edges, and the electromagnet ropes are respectively installed in the plurality of nodes.

4. The method of claim 3, wherein the realizing of the real-time spatial structure includes expressing the real-time spatial structure by controlling water spray modules installed at an edge of a corresponding position according to the movement path of the player to spray water.

5. The method of claim 4, wherein the realizing of the real-time spatial structure includes expressing the real-time spatial structure by lowering electromagnet ropes installed at nodes of a corresponding position to a floor.

6. The method of claim 1, further comprising:

detecting a player approach to the real-time spatial structure realized by water and electromagnet ropes; and transmitting an alarm signal to a device possessed by the player.

7. The method of claim 1, further comprising before the realizing of the real-time spatial structure, performing scale mapping between a virtual space and a real space.

8. The method of claim 7, wherein the performing scale mapping includes performing the scale mapping in consideration of at least one of a ratio of a size of the virtual space to a size of the real space, a size of an idle space around the player, and a reflected weight and a direction change weight between a movement of the player in the real space and a movement of the player in the virtual space.

9. The method of claim 1, wherein the tracking the movement path of the player includes:

learning using data collected from movement paths of a plurality of players; and predicting a location of the player based on a learning result.

10. An apparatus for realizing a real-time spatial structure that realizes a spatial structure in real time, the apparatus comprising:

a tracker that tracks a location of a player; and a structure realizer that realizes the real-time spatial structure using water and electromagnet ropes in a space on a movement path of the player according to the location of the player.

11. The apparatus of claim 10, wherein the structure realizer includes:

water spray modules that are located in a mesh structure installed on a ceiling and spray water according to a first control signal;

an electromagnet rope module that lowers the electromagnet ropes, the electromagnet ropes being installed in the mesh structure, to a floor according to a second control signal; and a control module that outputs the first control signal and the second control signal to the water spray modules and the electromagnet rope module according to the movement path of the player.

12. The apparatus of claim 11, wherein the mesh structure is composed of a plurality of layers, and the structure realizer further includes a temperature control module for providing water at different temperatures for each of the layers of the mesh structure.

13. The apparatus of claim 11, wherein the mesh structure includes a plurality of nodes and a plurality of edges connecting between the plurality of nodes, and the water spray modules are respectively installed on the plurality of edges, and the electromagnet ropes are respectively installed on the plurality of nodes.

14. The apparatus of claim 13, wherein the water spray modules respectively installed at the plurality of edges operate independently according to the first control signal of the control module.

15. The apparatus of claim 11, wherein the structure realizer further includes an infrared sensor for detecting a player approach to the real-time spatial structure realized with water and electromagnet ropes, and the tracker transmits an alarm signal based on a detection result of the infrared sensor.

16. The apparatus of claim 11, wherein the structure realizer includes:

a water collection module that collects the water sprayed by the water spraying modules; and a water circulation module that circulates the collected water and supplies the collected water to the water spray modules.

17. The apparatus of claim 11, further comprising a spatial structure calculator that performs scale mapping between a virtual space and a real space for the real-time spatial structure.

18. The apparatus of claim 11, wherein the tracker learns using data collected from movement paths of a plurality of players, and predicts the location of the player based on a learning result.

19. The apparatus of claim 11, wherein the real-time spatial structure includes at least one of a window, a wall or a door.

* * * * *